United States Patent Office 2,879,148
Patented Mar. 24, 1959

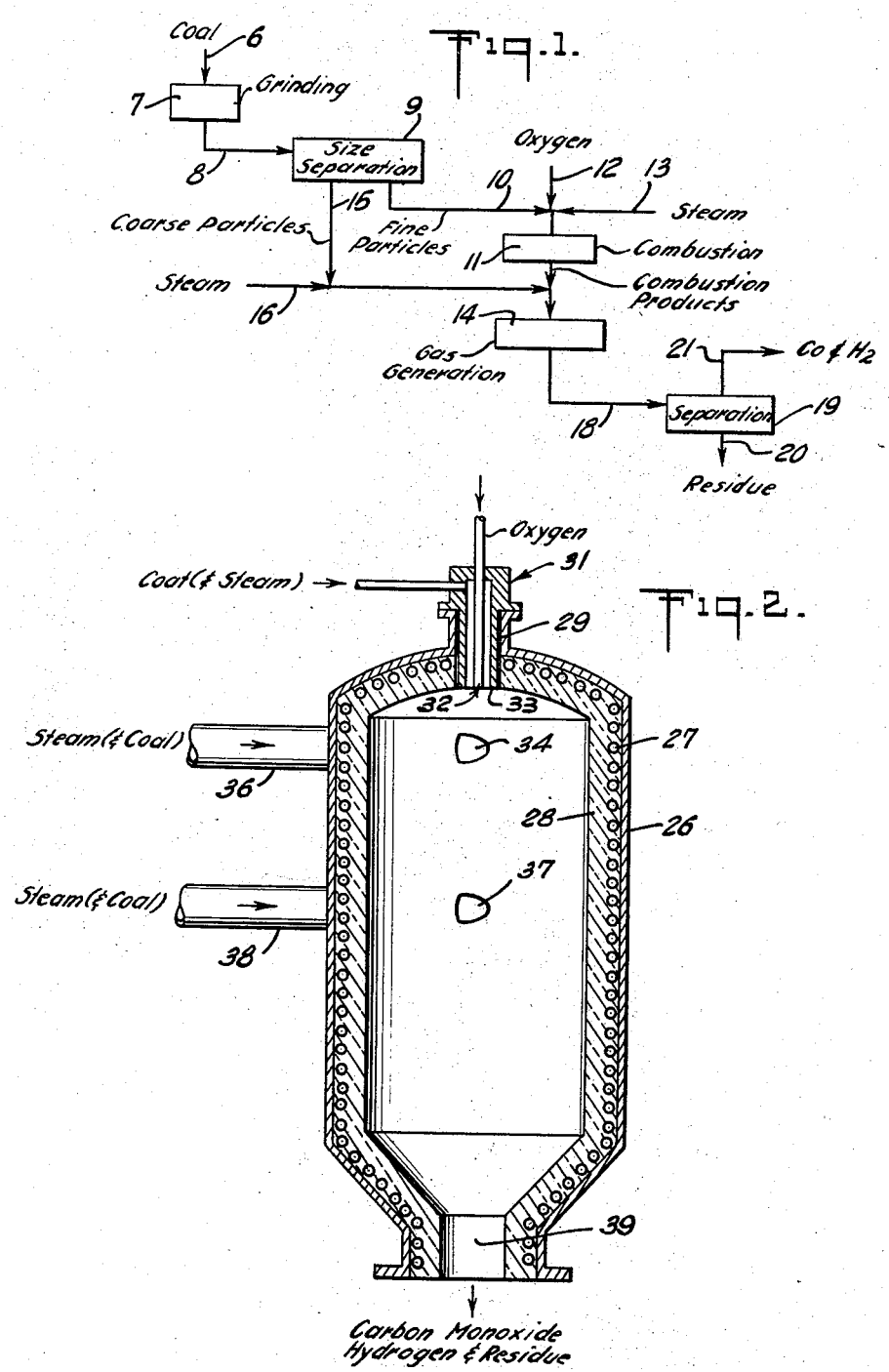

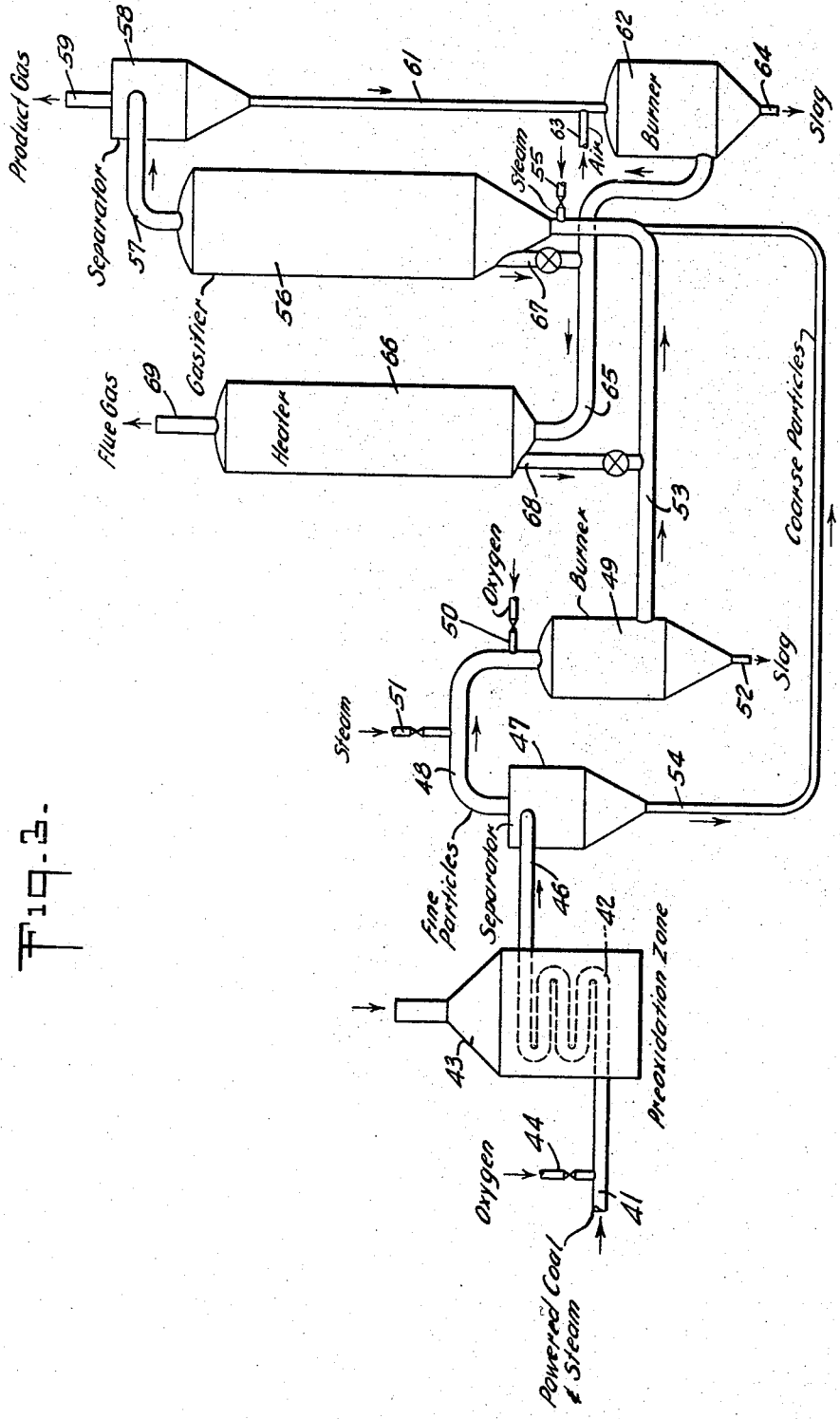

2,879,148

PROCESS FOR THE PRODUCTION OF CARBON MONOXIDE FROM A SOLID FUEL

Harold V. Atwell, Beacon, N.Y., assignor to The Texas Company, New York, N.Y., a corporation of Delaware Original application May 31, 1952, Serial No. 290,921, now Patent No. 2,761,772, dated September 4, 1956. Divided and this application December 6, 1955, Serial No. 551,387

4 Claims. (Cl. 48—206)

This invention relates to a process for the generation of carbon monoxide from a solid carbonaceous fuel. In one of its more specific aspects, this invention relates to an improved method for the production of a mixture of carbon monoxide and hydrogen from a solid carbonaceous fuel. The process is particularly applicable to the reaction of powdered coal with oxygen and steam to produce carbon monoxide and hydrogen.

Gasification of coal to carbon monoxide is an industrially important operation. Coal and related solid fuels may be reacted with a restricted quantity of free oxygen at temperatures above about 2,000° F. to produce carbon monoxide relatively free from carbon dioxide. The reaction may be carried out with air, in which case the product gas contains a relatively high percentage of nitrogen. Because this is generally undesirable, oxygen or oxygen-enriched air may be preferred. In any case, the reaction, being exothermic, liberates more heat than is required to maintain the desired reaction temperature. Carbon dioxide or steam may be added to the reaction zone to control the reaction temperature. Steam is generally preferred as an auxiliary reactant serving to control the temperature in the reaction zone and at the same time to produce hydrogen.

A number of processes have been developed for gasification of coal. In one, a downwardly moving bed of coal is contacted with an upwardly moving current of air, or oxygen, and steam. In another, the gaseous reactants pass upwardly through a bed of particles of the solid fuel at a rate such that the particles are violently agitated by the gaseous reactants and reaction products but are not entrained therein. This process is generally known as "fluid bed" gasification, indicating that the gasification takes place in a bed of solid particles which, due to the action of the gases, has the appearance of a boiling liquid. In still another, powdered coal is subjected to reaction with the gaseous reactants while entrained in the reactants and reaction products. The relative proportions of solid fuel and reactants is so adjusted that there is little or no excess fuel supplied to the reaction zone. This process may be designated as "flow-type" gas generation. As used hereinafter, the term "flow-type" gas generation designates such a process in which the coal is reacted with an oxygen-containing gas while entrained therein.

In accordance with this invention, a portion of the fuel is burned substantially completely, while a further portion is subjected to reaction with the resulting gaseous products of combustion to produce carbon monoxide and hydrogen.

Various solid fuels including lignite, anthracite, and bituminous coals, coke, and oil shale may be subjected to gasification.

Carbon monoxide, hydrogen and mixtures thereof are useful in a number of industrial processes. For example, liquid hydrocarbons suitable for use as motor fuels may be produced by reaction of hydrogen with carbon monoxide in the Fischer-Tropsch type synthesis reaction. Carbon monoxide and hydrogen are useful, either alone or in admixture with one another, for the reduction of iron oxide to sponge iron. Hydrogen finds use in a number of commercial processes such as the synthesis of ammonia, hydrogenation processes, catalytic conversion of petroleum hydrocarbons, etc. Carbon monoxide is readily converted to hydrogen by the so-called water gas shift process in which carbon monoxide is reacted with steam to produce hydrogen and carbon dioxide.

As previously mentioned, air, oxygen-enriched air or commercially pure oxygen may be used in gas generation. Commercially pure oxygen is preferred for the generation of gases in those instances in which nitrogen is undesirable in the product. In generating gas for ammonia synthesis, oxygen-enriched air may be preferred.

For the production of maximum yields of carbon monoxide and hydrogen in the flow-type generator, the temperature must be maintained above about 2,000° F., and preferably above about 2,200° F. The temperature may range as high as 3,000° F., or even higher, the maximum being limited by the properties of available materials of construction.

The gasification reaction may be conducted at either atmospheric or at an elevated pressure. Preferably the reaction is conducted at a pressure in excess of 100 p. s. i. g. Pressures on the order of 500 p. s. i. g. or higher may be used. At elevated pressures, the rate of reaction is somewhat higher than at lower pressures.

In the gasification of solid fuels generally, it is desirable to limit oxygen consumption to the practical minimum consistent with satisfactory operation; i. e., it is desirable to limit the quantity of oxygen supplied to the reaction zone to near-theoretical quantities to produce carbon monoxide with minimum production of undesirable carbon dioxide and water vapor. Low oxygen consumption is also important from the economic standpoint, particularly if substantially pure oxygen is required. Limiting the quantity of oxygen often leads, however, to incomplete consumption of carbon. This problem is particularly evident in gasification of solid fuel in the flow-type gasification reactor or in the fluid bed reactor.

Theoretically, the rate of gasification of solid fuel with an oxygen-containing gas should increase as the particle size of the solid fuel is decreased. This follows from the fact that as the particle size decreases, the surface area per unit mass increases. Since the oxidation takes place on the surface of the particles, it is to be expected that the rate of gasification of very fine particles would be much greater than that of the somewhat larger particles, for example, those granular in size. Accordingly, it might be expected that the very fine particles of solid material which are often entrained in the product gas from the gasification zone would be essentially ash. In practice, however, it is often found that fine particles are carried from the reaction zone in the product gas stream before their carbon content has been completely consumed. Fine particles of solid material carried from the reaction zone in the product gas often contain a surprisingly high proportion of unreacted carbon. The present invention overcomes this problem by substantially completely consuming the fine particles as will be explained in greater detail hereinafter.

One of the objects of this invention is to provide an improved process for the generation of carbon monoxide and hydrogen from a solid carbonaceous fuel by reaction with oxygen in a flow-type gas generator. Another object is to provide a process for generation of carbon monoxide and hydrogen in such a system wherein the efficiency of gasification is substantially increased.

In accordance with this invention, solid fuel, for example, coal, is reduced to a particle size smaller than 40 mesh (Tyler standard screen scale), commercially referred to a powdered coal. Before the powdered coal is subjected to gasification the finest particles are separated therefrom, for example, by screening. The fine particles are fed into the reaction zone into admixture with a stream of oxygen-containing gas in such proportions that they are completely burned to carbon dioxide, thus yielding combustion products at a very high temperature. Steam may be employed in the primary combustion zone to control temperature.

The high temperature stream of gases, comprising carbon dioxide and steam, is brought into contact with the coarser particles of coal under reaction conditions favorable for the production of carbon monoxide and hydrogen. Contact between the hot carbon dioxide and steam, and the coarser particles of fuel is preferably conducted in a gas generation zone in which a high degree of turbulence is attained. Preferably an excess of relatively coarse coal particles is maintained in this gas generation zone.

The separation of fine particles from coarser particles may be effected by any of a number of conventional means; for example, separation may be accomplished by screening, or by classifying in a centrifugal classifier or hydraulic classifier. The fine particles may be separated from the coarser particles by elutriation, particularly by passing a stream of gas upwardly through a mixture of the particles at a rate sufficient to entrain the fine particles but insufficient to entrain the coarser particles.

Particles smaller than about 200 mesh (Tyler standard screen scale) (about 75 microns in average diameter) are eliminated from the coarser coal supplied to the reactor as a secondary stream for reaction with steam and carbon dioxide. The particles smaller than about 75 microns are supplied to the burner for complete combustion to carbon dioxide. Coarser particles may be present in the stream supplied to the burner, but substantially all of the particles smaller than about 75 microns are removed from the coarser particles supplied as a secondary stream to the gas generator. The coarser particles are of a size falling within the range of 40 to 200 mesh or about 75 to 350 microns.

Preferably the process comprises complete combustion of all of the particles of fuel smaller than about 75 microns with oxygen in a reaction zone free from packing and catalyst to produce a high temperature stream of fully oxidized products of combustion comprising carbon dioxide and water vapor. Particles of solid carbonaceous fuel having a particle size within the range of from about 75 to about 350 microns are introduced into the reaction zone into contact with the high temperature stream of carbon dioxide within the reaction zone to produce carbon monoxide and hydrogen.

The streams of reactants supplied to the generator may be preheated. In general, the oxygen stream may be preheated to a temperature ranging up to about 600° F. Air may be preheated without difficulty to a considerably higher temperature, for example, 1,200° F. The steam and coal also are preferably preheated, for example, to a temperature within the range of 600 to 1,200° F. The temperatures given for the preheat temperatures are illustrative only and are not to be construed as limiting temperatures.

In accordance with one embodiment of my invention, combustion of the finest portion of the coal is conducted in a downwardly flowing primary stream entirely surrounded by a secondary stream of steam and, optionally, coarser particles of coal which serve to protect the walls of the reaction chamber from excessive temperatures. Part or all of the coarser coal, and additional steam, if desired, may be introduced into the reaction zone well below the point of introduction of the fine coal. The quantity of coarser coal introduced to the reaction zone is sufficient to reduce substantially all of the carbon dioxide, produced by combustion of the fine particles, to carbon monoxide without permitting the reaction temperature to fall below about 2,000° F. Also, some of the coal reacts with steam to produce hydrogen and carbon monoxide.

In another, the fine coal is burned in a separate generator which is maintained at a temperature above the slagging temperature of the coal ash. Ash is drawn from the combustion chamber as molten slag. The hot combustion gases, substantially free from entrained solid particles, are passed into a separate reactor where they are contacted with coarse particles of coal, preferably in a fluid bed. Fine particles resulting from decrepitation of the coarser particles during gasification may be supplied as fuel to the burner as a supplement to the fine particles, or separately burned to supply heat for the gasification reaction, as will be brought out in greater detail hereinafter.

The invention will be most readily understood with reference to the accompanying drawings.

Figure 1 of the drawings is a diagrammatic representation of the process of the present invention as applied to the generation of synthesis gas from coal.

Figure 2 is a vertical cross-sectional view of a gas generator suitable for use in the present process, illustrating a preferred method of introducing the various reactants.

Figure 3 is a more or less diagrammatic illustration of an arrangement of apparatus suitable for carrying out a preferred modification of this invention.

With reference to Figure 1 of the drawings, which is largely self-explanatory, coal from a suitable source is introduced through line 6 to a grinding operation 7, where it is ground to a powder of a size such that all of the coal particles pass a 40 mesh screen, but preferably not more than 50 percent of the particles pass a 200 mesh screen. This powdered coal is passed through line 8 to a size separation step 9 where particles smaller than 200 mesh are separated from the coarser particles. The fine particles, which may optionally contain particles larger than 200 mesh, pass through line 10 to a combustion zone 11. Sufficient oxygen for complete combustion of the fine particles is introduced through line 12. Steam may be supplied to the combustion zone through line 13.

The products of combustion comprising principally carbon dioxide and steam, are introduced into a gas generation zone 14. Coarse particles which contain no particles smaller than 200 mesh, pass through line 15 to the gas generation zone. Steam is introduced into the gas generation zone through line 16. In the gas generation zone, the coarse particles react with steam and the hot carbon dioxide resulting from combustion of the fine particles, to produce a mixture of carbon monoxide and hydrogen. The product gas is discharged from the gas generator through line 18. Solid residue entrained in the product gas stream may be removed therefrom in a separation step 19 and discarded through line 20. The product gas is discharged through line 21.

Figure 2 illustrates apparatus suitable for carrying out the combustion of fine particles and generation of gas from the coarse particles in a single reactor. The reaction comprises a vertical cylindrical vessel having an outer wall 26 designed to withstand the required operating pressure. This pressure may range as high as 1,000 pounds per square inch gauge; generally the pressure will range from about 50 to about 600 pounds per square inch gauge. Adjacent the inner wall of the pressure vessel, a cooling coil 27 is provided to protect the wall of the vessel from overheating. A refractory lining 28 within the vessel reduces the heat loss to the cooling coils.

Oxygen and the fine coal are introduced to the generator through a flanged inlet 29 in the top of the generator. Oxygen, coal, and steam are mixed with one another by a burner 31. The burner, per se, is not a part of the present invention. As illustrated, it comprises a conduit 32 for discharging oxygen into the reaction zone and a concentric conduit 33 coextensive with conduit 32 for discharging a stream of coal and steam into the reaction zone. It will be evident that the coal may be propelled into the reaction zone by means of a gas other than steam, as, for example, air, carbon dioxide, recycled product gas, or the like.

Steam, optionally containing coarse coal, is introduced into the upper part of the reaction zone adjacent the point of introduction of the fine coal through an inlet 34 supplied by line 35. Preferably, inlet 34 is arranged tangentially to the inner wall of the reaction zone. Similarly, coarse coal, optionally mixed with additional steam, may be introduced at an intermediate point in the reactor through inlet 37 supplied by line 38. Any number of inlets 34 and 37 may be provided. Steam and coal introduced into the region surrounding the zone of combustion of the fine coal forms a protective blanket along the inner wall of the reactor to prevent overheating of the wall of the reactor. The temperature maintained in the reactor should be above 1,800° F. and preferably within the range of 2,200 to 2,600° F. Product gases and residual solid particles are discharged from the reactor through outlet 39 at the bottom of the reactor.

Figure 3 illustrates another embodiment of the present invention. This embodiment provides for, among other things, the handling of coals which tend to cake or agglomerate on heating. The caking tendency may be substantially reduced by partial oxidation or charring of the coal particles. As in the other embodiment, powdered coal, having a particle size range such that all particles are smaller than 40 mesh and a portion are smaller than 200 mesh (Tyler standard screen scale), is used. The powdered coal is mixed with steam and introduced through line 41 to a heating coil 42 disposed within a furnace 43. Oxygen may be introduced to the heating coil into admixture with the powdered coal and steam through line 44. A temperature within the range of 400 to 700° F. is maintained in the preoxidation zone, or heating coil 42. Preoxidation or partial oxidation of the coal takes place within the coil 42 to render the coal particles substantially non-caking in character. The preoxidized coal is discharged through line 46 into a cyclone separator 47.

Steam and gases from the coal, carrying with them the fine particles of coal, pass from the separator through line 48 to a combustion chamber or burner 49. Sufficient oxygen for complete combustion of the fine particles of coal is introduced to the burner through line 50. Additional steam may be added, if desired, by means of line 51. In the burner 49, the fine particles are completely burned to carbon dioxide and steam, preferably at a temperature above the melting point of the ash or slag. This temperature usually is above about 2,200° F. The molten ash or slag is discharged from the burner through line 52. The resulting hot products of combustion, substantially free from solid particles, leaves the burner 49 through line 53.

Coarse particles of the original stream of powdered coal are passed from separator 47 through line 54 to a gasification unit 56. A dense phase fluidized bed of coarse particles is maintained in the gasifier 56. Hot gases from the burner 49 are introduced to the gasifier through line 53, while additional steam may be supplied through line 55. In the gasifier, steam and carbon dioxide react with the coarse particles of coal to produce carbon monoxide and hydrogen. The temperature in this reaction zone is above about 1,800° F., but below the temperature which causes softening of the ash. The temperature will generally be within the range of from about 1,800° F. to about 2,100° F.

Carbon monoxide and hydrogen, generated as the result of reaction between the coarse particles of coal and the hot combustion products in gasifier 56, are discharged therefrom through line 57 to a cyclone separator 58. These gases contain fine particles of solid residue resulting from decrepitation of the coal particles in the fluid bed. The fine particles are removed from the product gas stream in separator 58; the product gas is discharged through line 59.

The fine particles carried overhead from the gasification unit 56 have a relatively high ash content, but still contain an appreciable amount of unreacted carbon. The fine particles from the separator 58 are passed through line 61 to a burner 62 where they are subjected to combustion with air introduced through line 63. Preferably, burner 62 is operated at a temperature above the fusion temperature of the ash or slag so that the molten ash or slag separates from the gases and is discharged from the burner through line 64.

Hot flue gases resulting from combustion of the fines in burner 62 pass through line 65 to a heater 66 where it is used to supply additional heat for the gasification unit 56. A stream of solid particles is withdrawn from gasifier 56 by line 67 and introduced into line 65 where the hot flue gases from burner 62 carry it into heater 66. A dense phase fluidized bed of the solid particles is maintained in heater 66. Heated particles of solid are withdrawn from the heater through line 68 and introduced into line 53 where the hot gases from burner 49 pick them up and carry them into gasifier 56.

Flue gases are discharged from heater 66 through line 69. If desired, these gases may be treated for the removal of entrained solid particles in the same manner as the gases discharged from gasifier 56 through line 57. Particles separated from the flue gases leaving line 69 may be supplied to either burner 49 or burner 62. It will be evident that the particles separated from the gases leaving gasifier 56 may also be supplied to burner 49, if desired, and that particles may be removed from either the heater 66 or gasifier 56 and supplied to either burner 49 or burner 62.

If desired, an excess of air may be supplied to burner 62 so that the hot flue gas passing through line 65 to heater 66 contains free oxygen. In this case, additional burning will take place in heater 66 to supply an additional quantity of heat to the stream of hot particles circulating from gasifier 56 through heater 66 and back to the gasifier.

This application is a division of my copending application Serial No. 290,921, filed May 31, 1952, now U.S. Patent 2,761,772.

Obviously many modifications and variations of the invention as hereinbefore set forth may be made without departing from the spirit and scope thereof, and therefore only such limitations should be imposed as are indicated in the appended claims.

I claim:

1. A process for the generation of carbon monoxide and hydrogen from powdered caking coal having a variable size range smaller than about 40 mesh which comprises subjecting said coal to preoxidation with a limited amount of free oxygen, separating resulting preoxidized coal into a coarse fraction containing coarse particles substantially free from finer particles and a fine fraction containing substantially of said finer particles, reacting said fine fraction with free oxygen and steam in suspension under conditions such that the carbon content of the fuel in said fraction is substantially completely consumed yielding hot gaseous products comprising carbon dioxide and steam, passing said coarse fraction substantially free from finer particles into a second reaction zone, maintaining a dense phase fluidized bed of coarse particles in said second reaction zone, and contacting said coarse particles with said hot gaseous product at a temperature above about 1800° F. such that said carbon dioxide is substantially completely reduced to carbon monoxide.

2. A process as defined in claim 1 wherein said preoxidation zone is maintained at a temperature in the range of 400 to 700° F.

3. A process for the generation of carbon monoxide and hydrogen from powdered caking coal having a variable size range smaller than about 40 mesh which comprises suspending said coal in steam and passing said suspension through a preoxidation reaction zone in admixture with a limited amount of free oxygen effecting oxidation of at least a portion of the volatiles of said coal, separating the effluent of said preoxidation zone into a coarse fraction containing coarse particles substantially free from finer particles and a fine fraction containing substantially all of said finer particles, reacting said fine fraction with free oxygen and steam in suspension under conditions such that the carbon content of the fuel in said fraction is substantially completely consumed yielding hot gaseous products comprising carbon dioxide and steam, passing said coarse fraction substantially free from finer particles into a second reaction zone, maintaining a dense phase fluidized bed of coarse particles in said second reaction zone, and contacting said coarse particles with said hot gaseous product at a temperature above about 1800° F. such that said carbon dioxide is substantially completely reduced to carbon monoxide, discharging resulting products of reaction from said second reaction zone comprising carbon monoxide and hydrogen containing entrained solid particles, separating said entrained particles from gaseous products of reaction and subjecting said particles to reaction with air under conditions effecting substantially complete consumption of the carbon content of said particles and producing hot combustion products, withdrawing coarse fuel particles from said fluidized bed, contacting said products of said coarse particles with said hot products of combustion effecting heating of said coarse particles, and returning said heated coarse particles to said fluidized bed.

4. A process as defined in claim 1 wherein said powdered solid carbonaceous fuel consists of particles smaller than 40 mesh and containing at least 25 percent and not more than 50 percent of said finer particles smaller than 200 mesh.

References Cited in the file of this patent

UNITED STATES PATENTS

| | | |
|---|---|---|
| 2,311,140 | Totzek | Feb. 16, 1943 |
| 2,621,117 | Garrison | Dec. 9, 1952 |
| 2,729,552 | Nelson | Jan. 3, 1956 |
| 2,761,772 | Atwell | Sept. 4, 1956 |

FOREIGN PATENTS

| | | |
|---|---|---|
| 459,044 | Italy | Aug. 23, 1950 |
| 152,285 | Australia | July 13, 1953 |